United States Patent
Romanovskiy et al.

(10) Patent No.: US 9,232,222 B2
(45) Date of Patent: Jan. 5, 2016

(54) LOSSLESS COLOR IMAGE COMPRESSION ADAPTIVELY USING SPATIAL PREDICTION OR INTER-COMPONENT PREDICTION

(71) Applicant: EMC Corporation, Hopkinton, MA (US)

(72) Inventors: Alexey Valentinovich Romanovskiy, St. Petersburg (RU); Marat Ravilevich Gilmutdinov, St. Petersburg (RU); Nikolay Dmitrievich Egorov, St. Petersburg (RU); Victor Anatolievich Yastrebov, St. Petersburg (RU); Dmitry Vadimovich Novikov, St. Petersburg (RU); Roman Alexandrovich Sokolovskiy, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 93 days.

(21) Appl. No.: 14/236,290

(22) PCT Filed: Mar. 15, 2013

(86) PCT No.: PCT/IB2013/001091
§ 371 (c)(1),
(2) Date: Jan. 30, 2014

(87) PCT Pub. No.: WO2014/140674
PCT Pub. Date: Sep. 18, 2014

(65) Prior Publication Data
US 2015/0146975 A1  May 28, 2015

(51) Int. Cl.
*G06K 9/36* (2006.01)
*H04N 19/103* (2014.01)
*H04N 19/105* (2014.01)
*H04N 19/186* (2014.01)
(Continued)

(52) U.S. Cl.
CPC ........... *H04N 19/103* (2014.11); *H04N 19/105* (2014.11); *H04N 19/136* (2014.11); *H04N 19/154* (2014.11); *H04N 19/182* (2014.11); *H04N 19/186* (2014.11); *H04N 19/593* (2014.11); *H04N 19/14* (2014.11); *H04N 19/91* (2014.11); *H04N 19/93* (2014.11)

(58) Field of Classification Search
CPC . H04N 19/103; H04N 19/593; H04N 19/136; H04N 19/186; H04N 19/105; H04N 19/93; H04N 19/14; H04N 19/154; H04N 19/82; H04N 19/91
USPC .......................... 382/166, 238, 239, 246, 247
See application file for complete search history.

(56) References Cited

U.S. PATENT DOCUMENTS

| | | | |
|---|---|---|---|
| 4,656,500 A * | 4/1987 | Mori | 348/396.1 |
| 5,903,674 A | 5/1999 | Ooi | |
| 6,868,186 B1 | 3/2005 | Sadeh | |
| 2007/0019872 A1 * | 1/2007 | Birinov et al. | 382/236 |
| 2012/0163471 A1 * | 6/2012 | Karczewicz et al. | 375/240.23 |

OTHER PUBLICATIONS

Advanced Video Coding for Generic Audiovisual Services, Series H: Audiovisual and Multimedia Systems, Jan. 2012, Recommendation ITU-T H.264, 680 pages.

(Continued)

*Primary Examiner* — Kanjibha Patel
(74) *Attorney, Agent, or Firm* — BainwoodHuang (57) ABSTRACT

An improved lossless image compression technique involves adaptively selecting between spatial prediction and inter-component prediction techniques depending on which allows better results for any given component of a digital image pixel.

20 Claims, 7 Drawing Sheets

(51) Int. Cl.
  *H04N 19/154* (2014.01)
  *H04N 19/182* (2014.01)
  *H04N 19/136* (2014.01)
  *H04N 19/593* (2014.01)
  H04N 19/91 (2014.01)
  H04N 19/14 (2014.01)
  H04N 19/93 (2014.01)

(56) References Cited

OTHER PUBLICATIONS

Raz Barequet and Meir Feder, Siclic: A Simple Inter-Color Lossless Image Coder, Data Compression Conference, Proceedings, 1999, 10 pages.

Marpe, et al., Context-Based Adaptive Binary Arithmetic Coding in the H.264/AVC Video Compression Standard, IEEE Transactions on Circuits and Systems for Video Technology, vol. 13, No. 7, Jul. 2003, 17 pages.

Information Technology—Lossless and Near-Lossless Compression of Continuous-Tone Still Images—Baseline, Series T: Terminals for Telematic Services, Jun. 1998, Recommendation ITU-T T.87, 75 pages.

Park, Sahng-Gyu, "Adaptive Lossless Video Compression," Dec. 2003, 103 pages.

International Search Report and Written Opinion of the International Searching Authority, International Application No. PCT/IB2013/001091, mailed Dec. 12, 2013, 7 pages.

Taubman, David, "User Manual for Kakadu's "kdu_winshow" and "kdu_macshow" Applications—last updated for version v7.0," UNSW, Copyright 2001, 32 pages. Accessed from <https://web.archive.org/web/20120320082702/http://www.kakadusoftware.com/documents/kdu_show.pdf>.

Adams, Michael D., "JasPer Software Reference Manual," Version 1.900.0, Last Revised: Dec. 7, 2006, Coding of Still Pictures, ISO/IEC JTC 1/SC 29/WG 1, N 2415, Date: Dec. 7, 2006, 37 pages. Accessed from <https://web.archive.org/web/20130303014013/http://www.ece.uvic.ca/~frodo/jasper/jasper.pdf>.

* cited by examiner

LOSSLESS COLOR IMAGE COMPRESSION ADAPTIVELY USING SPATIAL PREDICTION OR INTER-COMPONENT PREDICTION

BACKGROUND

Digital images, especially when considered en masse, can utilize large amounts of data storage. In order to reduce the amount of storage needed, image compression may be used. Under certain conditions, it may be desirable to avoid losing any detail stored within an image when compresses. Under such circumstances, a lossless image compression algorithm may be used.

Various lossless image compression algorithms are known. One particular lossless image compression algorithm is the JPEG-LS algorithm. JPEG-LS uses prediction modeling in order to compactly encode prediction errors. The prediction modeling used by JPEG-LS is a form of spatial prediction which uses median edge detection. Another known image compression algorithm uses an inter-component prediction technique instead of spatial prediction. This known inter-component prediction technique takes advantage of decorrelation of similarities between color channels in an image.

SUMMARY

The above-described conventional techniques for performing lossless image compression are not entirely optimal. For example, the JPEG-LS approach may be sub-optimal when an image includes a high correlation between color channels. In addition, the inter-component prediction technique may be sub-optimal when two or more color channels exhibit low correlation, such as in many non-photographic graphical images.

Thus, it would be desirable to compress images in a lossless manner while taking advantages of both spatial prediction and inter-component prediction in a way that enables optimal decorrelation and minimal output size. Thus, an improved technique involves adaptively selecting between spatial prediction and inter-component prediction techniques depending on which allows better results for any given component of a digital image pixel.

One embodiment is directed to a method performed by a computing device. The method includes (1) receiving an image file, the image file having a set of pixels arranged in a grid, each pixel of the set of pixels having a plurality of color components, (2) for each pixel of a subset of the set of pixels, (A) for a first color component of the plurality of color components, (i) predicting a value of the first color component of that pixel using a first prediction technique to yield a first predicted color value, the first prediction technique including median edge detection and (ii) computing a difference between the first predicted color value and the value of the first color component to yield a first error value for that pixel, (B) for a second color component of the plurality of color components, the second color component being distinct from the first color component, (i) predicting a value of the second color component of that pixel using the first prediction technique to yield a second predicted color value, (ii) predicting the value of the second color component of that pixel using a second prediction technique to yield a third predicted color value, the second prediction technique lacking median edge detection, the second prediction technique utilizing inter-component prediction with respect to the first color component, (iii) selecting whichever of the second predicted color value and the third predicted color value is closer to the value of the second color component to yield a selected predicted color value, and (iv) computing a difference between the selected predicted color value and the value of the second color component to yield a second error value for that pixel, and (C) encoding the first error value for that pixel and the second error value for that pixel in a compressed color image output stream, and (3) writing the compressed color image output stream to persistent storage as an output compressed image file. Other embodiments are directed to a computerized apparatus and a computer program product for performing a method similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to techniques for adaptively selecting between spatial prediction and inter-component prediction techniques depending on which allows better results for any given component of a digital image pixel.

Figure 1:
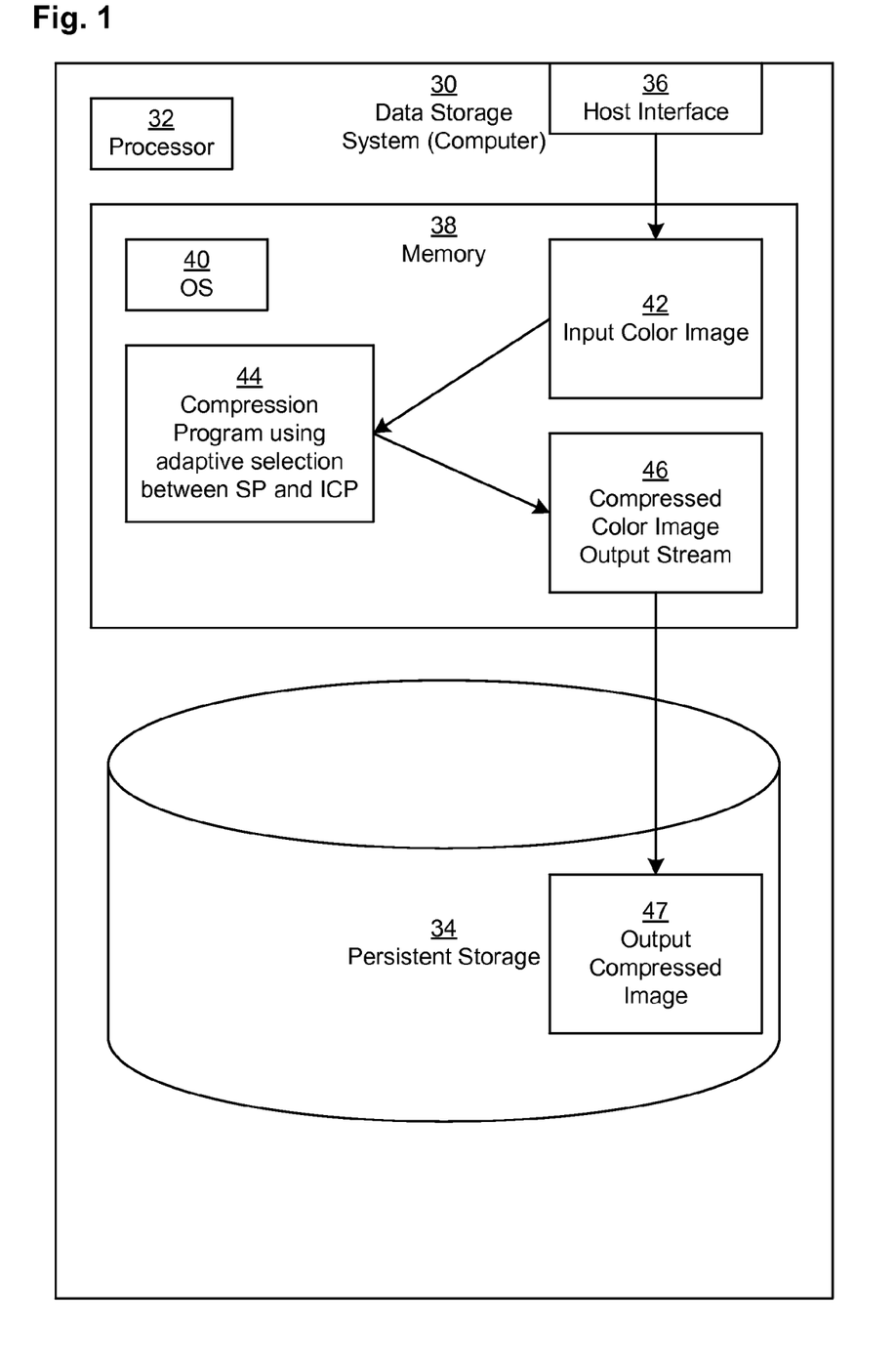
FIG. 1 depicts an example apparatus according to various embodiments.

FIG. 1 depicts an example data storage system computer 30, such as, for example, a NAS data storage system, which provides access to one or more filesystems stored thereon, or a SAN data storage system, which provides block-based access to one or more volumes stored thereon. In some embodiments, DSS 30 provides both block-based access to logical volumes as well as file-based access to filesystems.

Computer 30 may be any kind of computing device, such as, for example, a personal computer, a workstation, a server, an enterprise server, a laptop computer, a mobile computer, a smart phone, a tablet computer, etc.

Computer 30 includes a processor 32. Processor 32 may be any kind of processor or set of processors configured to perform operations, such as, for example, a microprocessor, a multi-core microprocessor, a digital signal processor, a collection of electronic circuits, or any combination of the above.

Computer 30 also includes persistent storage 34, such as one or more hard disk drives and solid-state storage devices (SSDs) connected either by an internal bus or via a network (e.g., a storage area network). Persistent storage 34 may be arranged in a fault tolerant arrangement, such as in a redundant array of independent disks (RAID), as is well-known in the art.

Computer 30 also includes memory 38. Memory 38 may be any kind of digital system memory, such as, for example, RAM. Memory 38 stores programs executing on processor 32 as well as data used by those programs. Memory 38 stores an operating system (OS) 40 and an improved compression program 44, both of which run on processor 32. Memory 38 may include both a system memory portion for storing programs and data in active use by the controller 32 as well as a persistent storage portion (e.g., solid-state storage and/or disk-based storage) for storing programs and data even while the computer 30 is powered off. However, in some embodiments, persistent storage portion may be included within persistent storage 34. OS 40 and improved compression program 44 are typically stored both in system memory and in persistent storage so that they may be loaded into system memory from persistent storage upon a system restart. Improved compression program 44, when stored in non-transient form either in system memory or in persistent storage, forms a computer program product. The processor 32 running the improved compression program 44 thus forms a specialized circuit constructed and arranged to carry out the various processes described herein. Memory 38 also stores an input color image file 42 and a compressed color image output stream 46.

Computer 30 also includes a host interface 36 for interfacing with a host computer, typically over a network connection. In operation, computer 30 receives input color image file 42 via host interface 36 for storage on persistent storage 34. In order to save space on persistent storage 34, instead of storing the input color image file 42 itself on persistent storage 34, improved compression program 44 first compresses the input color image file 42 using improved compression techniques described herein to yield compressed color image output stream 46, which is then stored on persistent storage 34 as output compressed image file 47. In addition, improved compression program 44 is also able to decompress output compressed image file 47 when read from persistent storage 34 to yield the original input color image file 42, which is then able to be sent across the host interface 36 to an entity requesting that file.

In some embodiments, not depicted, instead of a host interface 36, computer 30 includes any other known or anticipated kind of interface capable of receiving an input color image file 42 from any source.

Figure 2:
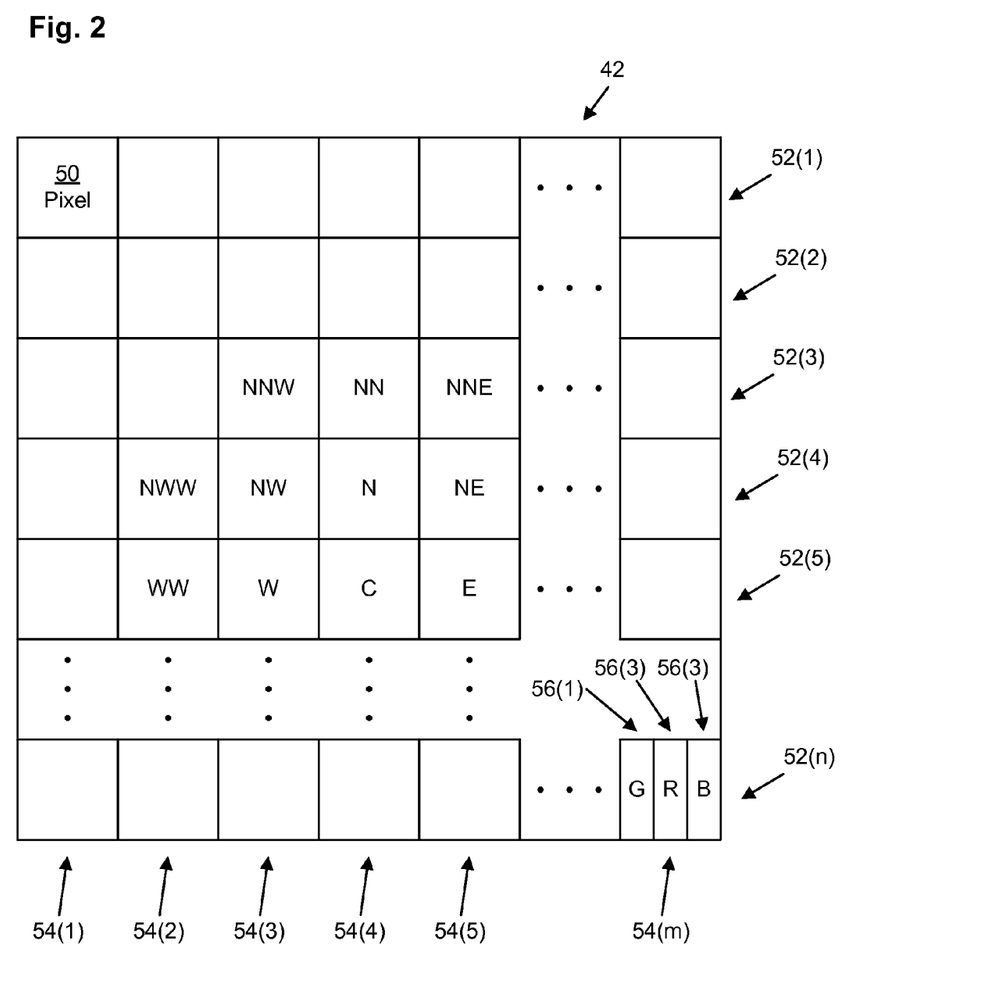
FIG. 2 depicts an example input image file for use with various embodiments.

FIG. 2 depicts an example input color image file 42 stored within memory 38 in further detail. Input color image file 42 includes a set of pixels 50 arranged in a grid, the grid having m pixels per row 52 horizontally and n pixels per column 54 vertically. Each pixel 50 includes three color components 56, typically first component 56(1) green, second component 56(2) red, and third component 56(3) blue. It should be understood that the color assignments of these various color components may vary. It should also be understood that the number of color components 56 is also an example. In some embodiments, only 2 color components 56 may be used, while in other embodiments, more than 3 color components 56 may be used.

Figure 3:
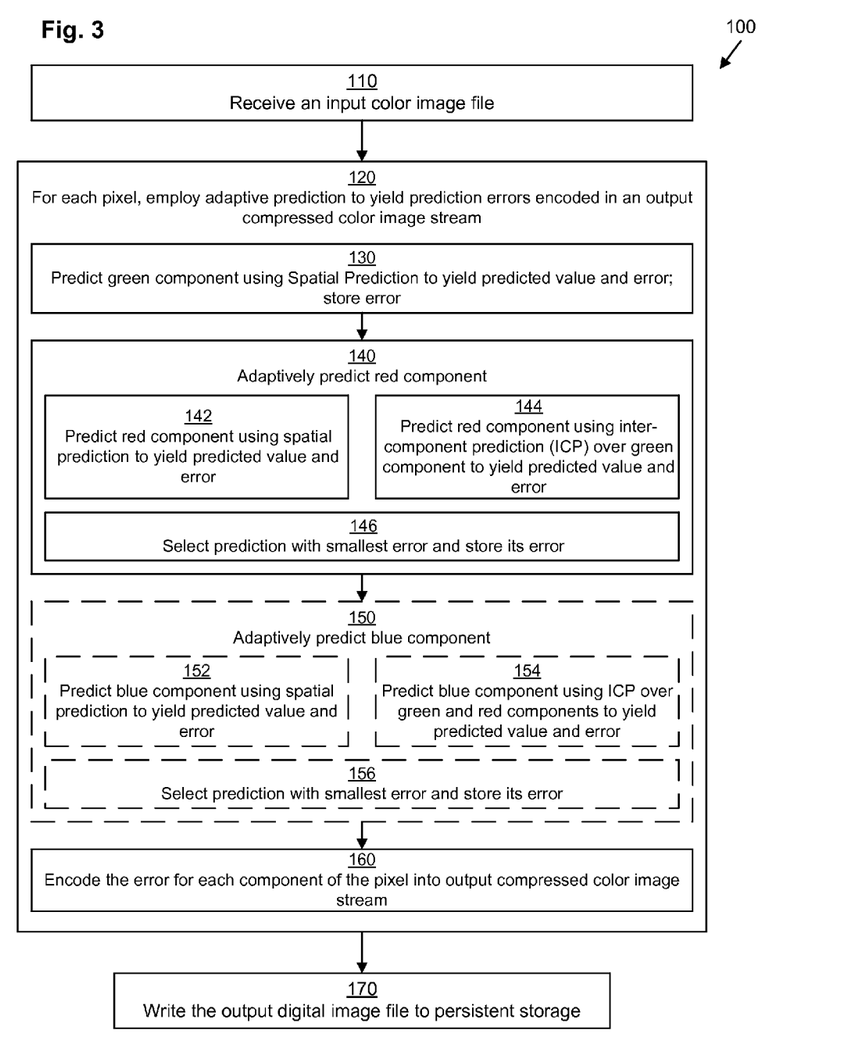
FIG. 3 depicts an example method according to various embodiments.

In processing input color image file 42, the improved compression program 44 iterates through various pixels 50, performing a method, such as method 100 depicted in FIG. 3. In some embodiments, the pixels 50 in the first row 52(1) and the first column 54(1) are not subject to compression, and they pass unchanged into compressed color image output stream 46. In other embodiments, the pixels 50 in the first row 52(1) and the first column 54(1) are subject to compression, but they are compressed using other well-known techniques not described herein. In some embodiments, the pixels 50 in the second row 52(2) and the second column 54(2) may also be treated differently. Thus, typically only a subset of the pixels 50 of the input color image file 42 (e.g., all pixels 50 except the pixels of the first row 52(1) and the first column 54(1)) are operated on according to method 100.

As improved compression program 44 iterates through various pixels 50 of the subset while performing method 100, the pixel that improved compression program 44 is iterating on at any given stage is referred to as pixel C. The pixel 50 immediately above pixel C is referred to as pixel N, the pixel 50 immediately to the left of pixel C is referred to as pixel W, and the pixel 50 immediately to the right of pixel C is referred to as pixel E. The pixel 50 immediately diagonally above and to the left of pixel C is referred to as pixel NW and the pixel 50 immediately diagonally above and to the right of pixel C is referred to as pixel NE. The pixel 50 two pixels left of pixel C is referred to as pixel WW and the pixel two pixels above pixel C is referred to as pixel NN. The pixel immediately to the left of pixel NN (which is also the pixel immediately above pixel NW) is referred to as pixel NNW and the pixel immediately to the right of pixel NN (which is also the pixel immediately above pixel NE) is referred to as pixel NNE. The pixel immediately to the left of pixel NW (which is also the pixel immediately above pixel WW) is referred to as pixel NWW.

FIG. 3 illustrates, as method 100, the operation of improved compression program 44 on computer 30 while compressing input color image file 42 according to various embodiments. It should be understood that any time a piece of software, such as, for example, improved compression program 44, is described as performing a method, process, step, or function, in actuality what is meant is that a computing device (e.g., computer 30) on which that piece of software is running performs the method, process, step, or function when executing that piece of software on its processor (e.g., processor 32). It should also be understood that, in some embodiments, instead of processor 32 executing code of improved compression program 44, specialized circuitry of the computer 30 operates to perform the method, process, step, or function directly in hardware.

In step 110, computer 30 receives input color image file 42 (e.g., via host interface 36) for compression and storage as output compressed image file 47 on persistent storage 34.

In step 120, improved compression program 44 compresses the input color image file 42 by iteratively employing an adaptive prediction scheme to all pixels 50 within a subset of the pixels of the input color image file 42 (e.g., all pixels 50 except the pixels in the first row 52(1) and the first column 54(1)), thereby yielding a set of prediction errors for all processed pixels 50, which is encoded within the compressed color image output stream 46.

Step 120 may be performed in various sub-steps 130-160 according to various embodiments.

In sub-step 130, improved compression program 44 predicts a first component 56(1) of pixel C using a first prediction technique. The first prediction technique is a spatial prediction technique which primarily uses values within the same color component 56(1) of nearby pixels above and to the left of pixel C to predict the value of the first color component 56(1) of pixel C. Details of the spatial prediction technique are described in further detail below in connection with FIG. 4. Upon predicting the value of the first color component 56(1) of pixel C, referred to as predicted value $PV_{gr}$, an error $ERR_{gr}$ is also calculated for that color component 56(1) of pixel C by subtracting the predicted value $PV_{gr}$ from the actual value $C_{gr}$ of the first color component 56(1) of pixel C from the input color image file 42. This error $ERR_{gr}$ is stored In sub-step 140, improved compression program 44 adaptively predicts a second component 56(2) of pixel C using both a spatial prediction technique and an inter-component prediction (ICP) technique which uses values from multiple color components 56 of C and nearby pixels above and to the left of pixel C to predict the value of the second color component 56(2) of pixel C. Improved compression program 44 does this adaptively by selecting which prediction technique yields a better result for the second component 56(2) of pixel C.

Sub-step 140 may be performed in various sub-sub-steps 142-146.

In sub-sub-step 142, improved compression program 44 predicts the second component 56(2) of pixel C using the spatial prediction technique. The first prediction technique is a spatial prediction technique which primarily uses values within the same color component 56(2) of nearby pixels above and to the left of pixel C to predict the value of the second color component 56(2) of pixel C. Details of the spatial prediction technique are described in further detail below in connection with FIG. 4. Upon predicting the value of the second color component 56(2) of pixel C using spatial prediction, referred to as $PV\_Spat_{red}$, an error $ERR\_Spa_{red}$ is also calculated for that color component 56(2) of pixel C by subtracting the predicted value $PV\_Spat_{red}$ from the actual value $C_r$ of the second color component 56(2) of pixel C from the input color image file 42.

In sub-sub-step 144, improved compression program 44 predicts the second component 56(2) of pixel C using a second prediction technique different from the first prediction technique. The second prediction technique is an ICP technique which uses values from multiple color components 56 of C and nearby pixels above and to the left of pixel C to predict the value of the second color component 56(2) of pixel C. In particular, improved compression program 44 calculates gradient values as follows (assuming that the first color component 56(1) is green and the second color component 56(2) is red):

$$dv=(W_{red}-NW_{red})-(W_{gr}-NW_{gr})$$

$$dh=(N_{red}-NW_{red})-(W_{gr}-NW_{gr})$$

$$dd=C_{gr}-NW_{gr}$$

where $W_{red}$ represents the red component 56(2) of pixel W and the other symbols have corresponding meanings. If dh and dv are both positive or negative, then the predicted value $PV\_ICP_{red}=NW_{gr}+dd+$ whichever of dh and dv has a larger absolute value. Otherwise, $PV\_ICP_{red}=NW_{gr}+dd+dh+dv$. Upon predicting the value of the second color component 56(2) of pixel C using ICP, referred to as $PV\_ICP_{red}$, an error $ERR\_ICP_{red}$ is also calculated for that color component 56(2) of pixel C by subtracting the predicted value $PV\_ICP_{red}$ from the actual value $C_r$ of the second color component 56(2) of pixel C from the input color image file 42.

In sub-sub-step 146, improved compression program 44 selects whichever of the predicted values $PV\_Spat_{red}$ and $PV\_ICP_{red}$ has a lower associated error, $ERR\_Spat_{red}$ or $ERR\_ICP_{red}$. That selected value becomes the predicted value $PV_{red}$ for the second color component 56(2) and the associated error becomes the error $ERR_{red}$ for the second color component 56(2). This error $ERR_{red}$ is stored.

In embodiments in which a third component 56(3) is used, sub-step 150 is also performed. In sub-step 150, improved compression program 44 adaptively predicts a third component 56(3) of pixel C using both a spatial prediction technique and an ICP technique which uses values from multiple color components 56 of C and nearby pixels above and to the left of pixel C to predict the value of the third color component 56(3) of pixel C. Improved compression program 44 does this adaptively by selecting which prediction technique yields a better result for the third component 56(3) of pixel C.

Sub-step 150 may be performed in various sub-sub-steps 152-156.

In sub-sub-step 152, improved compression program 44 predicts the third component 56(3) of pixel C using the spatial prediction technique. The first prediction technique is a spatial prediction technique which primarily uses values within the same color component 56(3) of nearby pixels above and to the left of pixel C to predict the value of the third color component 56(3) of pixel C. Details of the spatial prediction technique are described in further detail below in connection with FIG. 4. Upon predicting the value of the third color component 56(3) of pixel C using spatial prediction, referred to as $PV\_Spat_{bl}$, an error $ERR\_Spat_{bl}$ is also calculated for that color component 56(3) of pixel C by subtracting the predicted value $PV\_Spat_{bl}$ from the actual value $C_{bl}$ of the third color component 56(3) of pixel C from the input color image file 42.

In sub-sub-step 154, improved compression program 44 predicts the third component 56(3) of pixel C using the ICP prediction technique. In particular, improved compression program 44 performs sub-sub-step 154 by applying ICP to the third color component 56(3) over both the first color component 56(1) and the second color component 56(2) and combining the results, yielding prediction $PV\_ICP_{bl}$ and error $ERR\_ICP_{bl}$. Further detail of sub-sub-step 154 is depicted below in connection with the description of FIG. 5.

In sub-sub-step 156, improved compression program 44 selects whichever of the predicted values $PV\_Spat_{bl}$ and $PV\_ICP_{bl}$ has a lower associated error, $ERR\_Spat_{bl}$ or $ERR\_ICP_{bl}$. That selected value becomes the predicted value $PV_{bl}$ for the third color component 56(3) and the associated error becomes the error $ERR_{bl}$ for the third color component 56(3). This error $ERR_{bl}$ is stored.

In embodiments in which more than three components 56 are used, sub-step 150 may be performed multiple times—once for each component beyond the second component 56(2). In each such performance of sub-step 150, sub-sub-step 154 may be modified to predict the component 56(X) in question using ICP over all previous components 56(1)-56(X−1).

In sub-step 160, improved compression program 44 encodes the error values for each color component—$ERR_{gr}$, $ERR_{red}$, and $ERR_{bl}$—in compressed color image output stream 46 in memory 38. Further detail of sub-step 160 is depicted below in connection with the description of FIG. 6.

In step 170, improved compression program 44 writes the output compressed color image output stream 46 into persistent storage 34 as output compressed image file 47.

Having stored the output compressed image file 47 in persistent storage 34, improved compression program 44 is also capable of performing method 100 in reverse to yield the original input color image file 42 and send it to the host interface 36. Any person having ordinary skill in the art should understand how to reverse method 100 in this manner.

Having described the operation of method 100, details of some of the sub-steps and sub-sub-steps will now be described as methods in further detail with respect to FIGS. 4-6.

Figure 4:
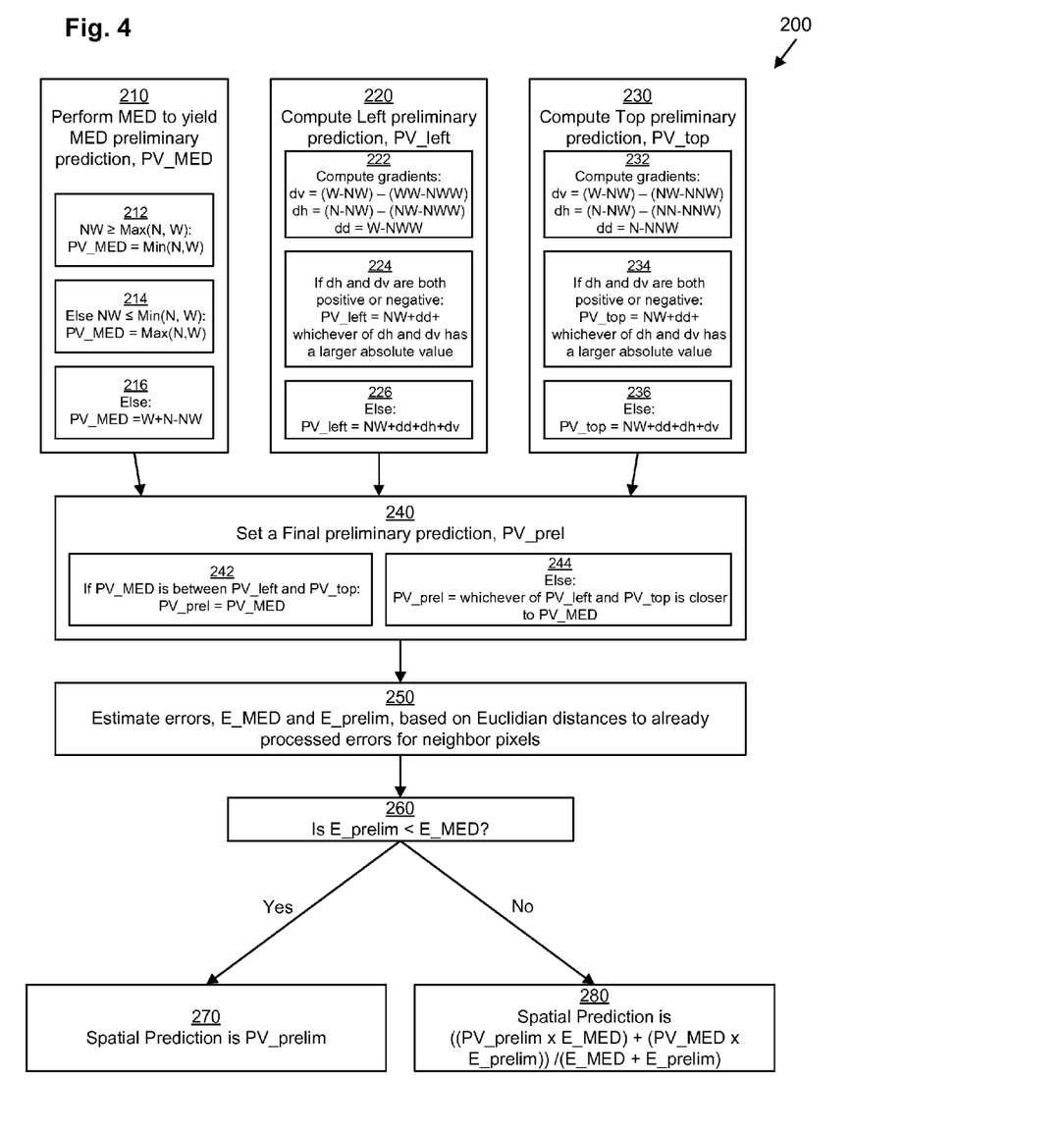
FIG. 4 depicts an example method according to various embodiments.

FIG. 4 depicts an example method 200 for performing spatial prediction for a given color component 56(X) (having color x) as in sub-sub-steps 142 and 152 from FIG. 3 in further detail. Method 200 involves first computing three preliminary values $PV\_MED_x$ (step 210), $PV\_left_x$ (step 220), and $PV\_top_x$ (step 230) before performing various other steps which utilize those preliminary values.

In step 210, improved compression program 44 performs a median edge detection (MED) technique as is well-known in the art. Thus, if $NW_x \geq Max(N_x, W_x)$, then sub-step 212 is performed, so $PV\_MED_x = Min(N_x, W_x)$. Otherwise, if $NW_x \leq Min(N_x, W_x)$, then sub-step 214 is performed, so $PV\_MED_x = Max(N_x, W_x)$. Otherwise, sub-step 216 is performed, so $PV\_MED_x = N_x + W_x - NW_x$.

In step 220, improved compression program 44 performs a technique similar to ICP but involving only one component 56(X), however the second components are created by shifting one pixel to the left. Thus, the improved compression program 44 computes the following gradients in sub-step 222:

$$dv = (W_x - NW_x) - (WW_x - NWW_x)$$

$$dh = (N_x - NW_x) - (NW_x - NWW_x)$$

$$dd = W_x - NWW_x$$

where $W_x$ represents the x component 56(X) of pixel W and the other symbols have corresponding meanings. If dh and dv are both positive or negative, then, in sub-step 224, the preliminary left value $PV\_left_x = NW_x + dd +$ whichever of dh and dv has a larger absolute value. Otherwise, in sub-step 226, $PV\_left_x = NW_x + dd + dh + dv$.

In step 230, improved compression program 44 performs a technique similar to ICP but involving only one component 56(X), however the second components are created by shifting up by one pixel. Thus, the improved compression program 44 computes the following gradients in sub-step 232:

$$dv = (W_x - NW_x) - (NW_x - NNW_x)$$

$$dh = (N_x - NW_x) - (NN_x - NNW_x)$$

$$dd = N_x - NNW_x$$

where $W_x$ represents the x component 56(X) of pixel W and the other symbols have corresponding meanings. If dh and dv are both positive or negative, then, in sub-step 234, the preliminary top value $PV\_top_x = NW_x + dd +$ whichever of dh and dv has a larger absolute value. Otherwise, in sub-step 236, $PV\_top_x = NW_x + dd + dh + dv$.

In step 240, improved compression program 44 sets a final preliminary prediction $PV\_prel_x$ for the x component 56(X) of pixel C by selecting between $PV\_MED_x$, $PV\_left_x$, and $PV\_top_x$. If $PV\_MED_x$ is between $PV\_left_x$ and $PV\_top_x$, then, in sub-step 242, improved compression program 44 selects $PV\_MED_x$ as the value of $PV\_prel_x$. Otherwise, in sub-step 244, improved compression program 44 selects whichever of $PV\_left_x$ and $PV\_top_x$ is closer to $PV\_MED_x$ in value as the value of $PV\_prel_x$.

In step 250, improved compression program 44 estimates an error $E\_MED_x$ associated with $PV\_MED_x$ and an error $E\_prelim_x$ associated with $PV\_prelim_x$ using nearby pixels' x component estimated errors weighted by their respective Euclidian distances. Thus, $$E\_MED_x \approx E\_MED_{x\_W}^2 + E\_MED_{x\_N}^2 + (0.71 \times E\_MED_{x\_NW})^2 + (0.5 \times E\_MED_{x\_WW})^2 + (0.5 \times E\_MED_{x\_NN})^2 + (0.45 \times E\_MED_{x\_NWW})^2 + (0.45 \times E\_MED_{x\_NNW})^2$$

where $E\_MED_{x\_W}$ represents the corresponding estimated error value $E\_MED_x$ previously computed for the same color component x 56(X) in pixel W and the other symbols have similar corresponding meanings.

Similarly, $$E\_prelim_x \approx E\_prelim_{x\_W}^2 + E\_prelim_{x\_N}^2 + (0.71 \times E\_prelim_{x\_NW})^2 + (0.5 \times E\_prelim_{x\_WW})^2 + (0.5 \times E\_prelim_{x\_NN})^2 + (0.45 \times E\_prelim_{x\_NWW})^2 + (0.45 \times E\_prelim_{x\_NNW})^2$$

where $E\_prelim_{x\_W}$ represents the corresponding estimated error value $E\_prelim_x$ previously computed for the same color component x 56(X) in pixel W and the other symbols have similar corresponding meanings.

In step 260, improved compression program 44 tests whether $E\_prelim_x < E\_MED_x$. If it is, then, in step 270, the spatial prediction result $PV\_Spat_x$ is set to $PV\_prelim_x$. Otherwise, in step 280, the spatial prediction result $PV\_Spat_x$ is set to a weighted average $((PV\_prelim_x \times E\_MED_x) + (PV\_MED_x \times E\_prelim_x))/(E\_MED_x + E\_prelim_x)$.

Figure 5:
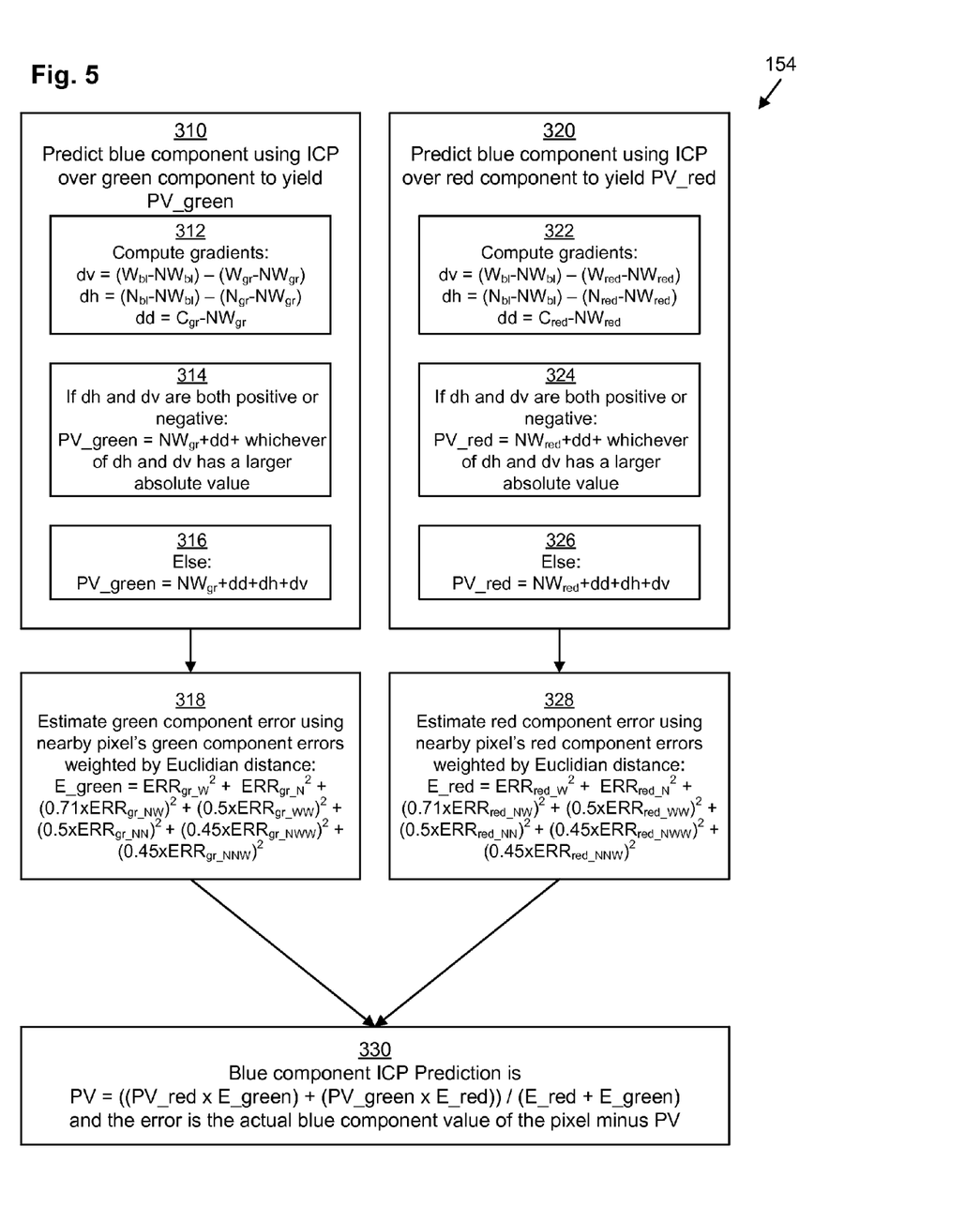
FIG. 5 depicts an example method according to various embodiments.

FIG. 5 depicts method 154 for performing ICP for the third color component 56(3) (having color blue) as in sub-sub-step 154 from FIG. 3 in further detail. Method 154 involves making two ICP predictions of the third color component 56(3) of pixel C—one based on the first color component 56(1) of pixel C (steps 310-318) and the other based on the second color component 56(2) of pixel C (steps 320-328).

In step 310, improved compression program 44 performs ICP over the first color component 56(1) of pixel C to yield PV_green. This step may be accomplished via several sub-steps 312-316. In sub-step 312, improved compression program 44 calculates gradient values as follows:

$$dv = (W_{bl} - NW_{bl}) - (W_{gr} - NW_{gr})$$

$$dh = (N_{bl} - NW_{bl}) - (N_{gr} - NW_{gr})$$

$$dd = C_{gr} - NW_{gr}$$

If dh and dv are both positive or negative, then, in sub-step 314 the predicted value is set to $PV\_green = NW_{gr} + dd +$ whichever of dh and dv has a larger absolute value. Otherwise, in sub-step 316 the predicted value is set to $PV\_green = NW_{gr} + dd + dh + dv$.

Upon calculating PV_green, improved compression program 44 also performs step 318, in which it estimates the error E_green of PV_green using nearby pixels' green component 56(1) errors weighted by their respective Euclidian distances from C. Thus $E\_green \approx ERR_{gr\_W}^2 + ERR_{gr\_N}^2 + (0.71 \times ERR_{gr\_NW})^2 + (0.5 \times ERR_{gr\_WW})^2 + (0.5 \times ERR_{gr\_NN})^2 + (0.45 \times ERR_{gr\_NWW})^2 + (0.45 \times ERR_{gr\_NNW})^2$.

In step 320, improved compression program 44 performs ICP over the second color component 56(2) of pixel C to yield PV_red. This step may be accomplished via several sub-steps 322-326. In sub-step 322, improved compression program 44 calculates gradient values as follows:

$$dv = (W_{bl} - NW_{bl}) - (W_{red} - NW_{red})$$

$$dh = (N_{bl} - NW_{bl}) - (N_{red} - NW_{red})$$

$$dd = C_{red} - NW_{red}$$

If dh and dv are both positive or negative, then, in sub-step 324 the predicted value is set to $PV\_red = NW_{red} \, dd +$ whichever of dh and dv has a larger absolute value. Otherwise, in sub-step 326 the predicted value is set to $PV\_red = NW_{red} + dd + dh + dv$.

Upon calculating PV_red, improved compression program 44 also performs step 328, in which it estimates the error E_red of PV_red using nearby pixels' red component 56(2) errors weighted by their respective Euclidian distances from C. Thus $E\_red \approx ERR_{red\_W}^2 + ERR_{red\_N}^2 + (0.71 \times ERR_{red\_NW})^2 + (0.5 \times ERR_{red\_WW})^2 + (0.5 \times ERR_{red\_NN})^2 + (0.45 \times ERR_{red\_NWW})^2 + (0.45 \times ERR_{red\_NN})^2$.

Upon completing steps 318 and 328, improved compression program 44 combines PV_green and PV_red in a weighted sum to yield the actual ICP prediction PV_ICP$_{bI}$ for the blue component 56(3). This is done according to the formula:

$$PV\_ICP_{bI}=((PV\_red \times E\_green)+(PV\_green \times E\_red))/(E\_red+E\_green).$$

Upon predicting the value of the third color component 56(3) of pixel C using ICP, referred to as PV_ICP$_{bI}$, an error ERR_ICP$_{bI}$ is also calculated for that color component 56(3) of pixel C by subtracting the predicted value PV_ICP$_{bI}$ from the actual value C$_{bI}$ of the third color component 56(3) of pixel C from the input color image file 42.

Figure 6:
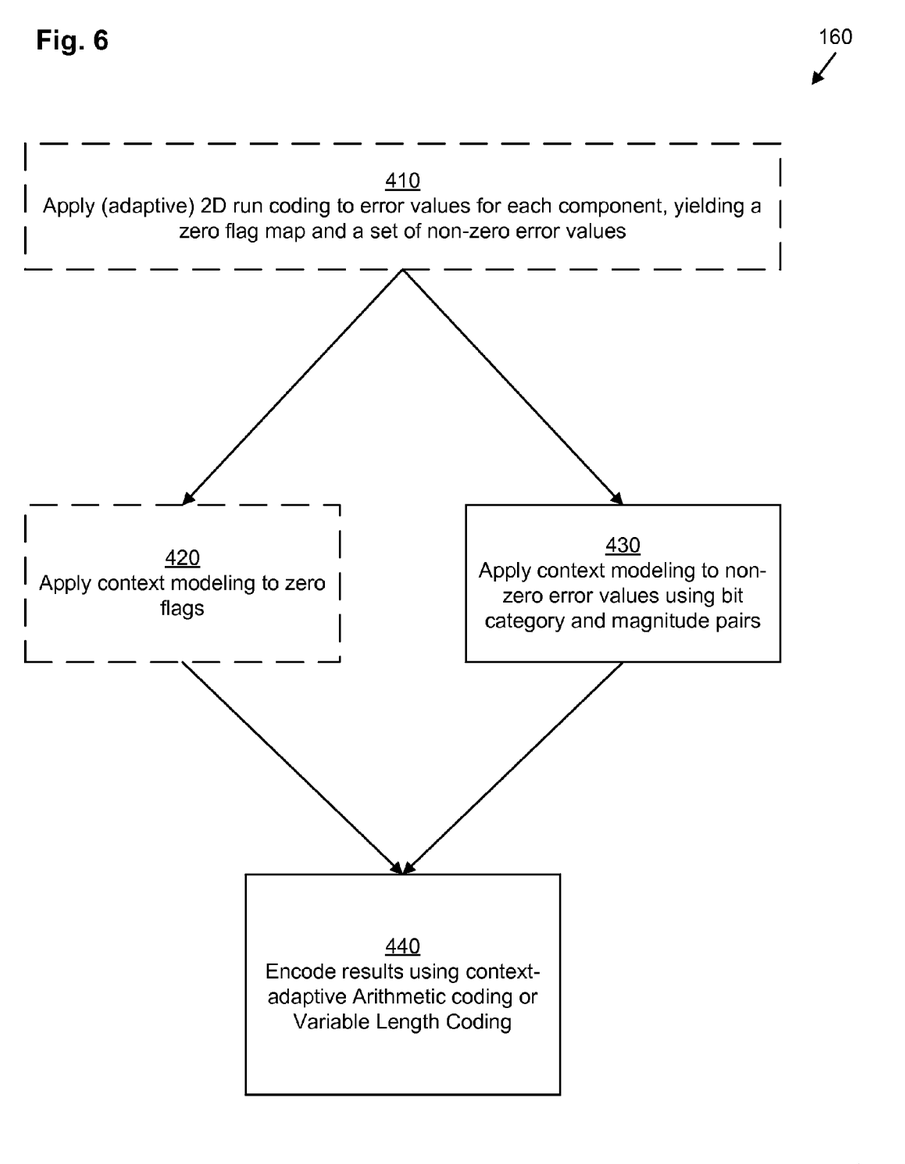
FIG. 6 depicts an example method according to various embodiments.

FIG. 6 depicts method 160 for encoding the errors for each component 56 of pixel C into compressed color image output stream 46 as in sub-sub-step 160 from FIG. 3 in further detail. Method 160 may be performed in various ways.

Figure 7:
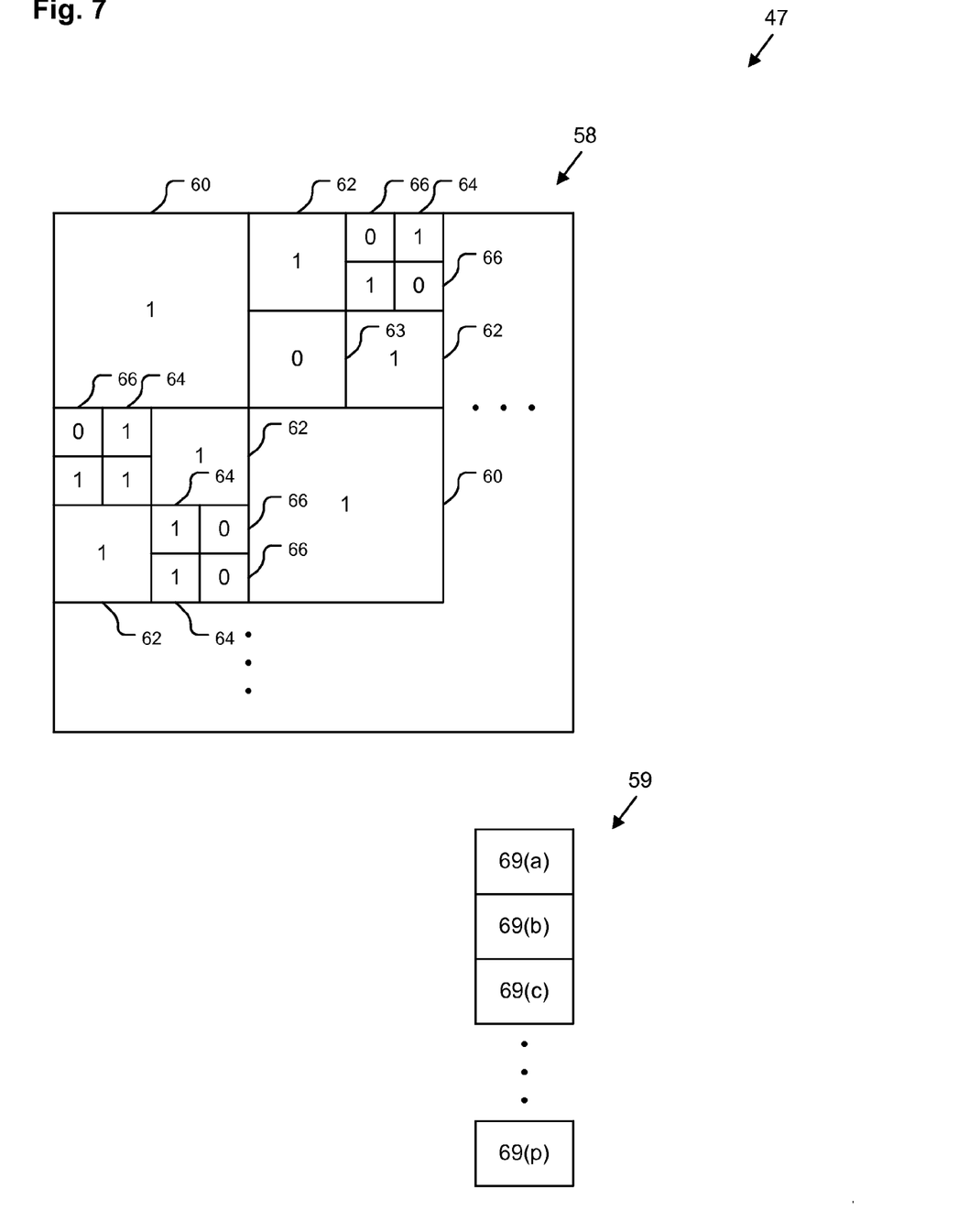
FIG. 7 depicts an example image file produced by various embodiments.

In some embodiments, method 160 begins by applying 2-dimensional run coding to the error values of each component 56 (optional step 410). Thus, if large blocks of errors ERR$_y$ for a particular component 56(Y) for several adjacent pixels 50 are all zero (indicating that the prediction was accurate for all those pixels 50), then the error for all such pixels 50 need only be encoded once. In some embodiments, the 2-dimensional run coding and is adaptive using zero-blocks, as depicted in FIG. 7. FIG. 7 depicts output compressed image file 47 in one component 56(Y). As depicted in FIG. 7, output compressed image file 47 includes a zero-block map 58 and an error list 59. Zero-block map 58 includes several full-size zero-blocks 60 (encoded with the value 1), indicating that all pixels within the full-size zero-blocks 60 have zero error for component 56(Y). As depicted, full-size zero-blocks 60 are 4 pixels wide by 4 pixels high. However, for regions of the output compressed image file 47 which do not contain all pixels 50 with zero error, progressively smaller zero-blocks may be used. Thus, 2 pixel by 2 pixel regions with zero error can be encoded by half-size zero-blocks 62, while single pixel regions with zero error can be encoded by quarter-size zero-blocks (or zero pixels) 64. It should be understood that the full-size zero blocks 60 being 4 pixels by 4 pixels is by way of example only; any power of two may be configured to serve as the squared size of the full-size zero blocks 60. Single pixel regions 66 that do not have zero error are encoded with the value 0. Multi-pixel regions with non-zero errors may also be encoded with blocks of value 0, such as 2×2 block 63. For non-zero error pixels 66 as well as for pixels within non-zero error blocks (e.g., block 63), the error for those pixels is also encoded as error entries 69 (depicted as error entries 69(a), 69(b), 69(c), . . . , 69(p)) within error list 59. Due to the presence of zero-block map 58, error list 59 need not include errors from pixels with zero error. The adaptive encoding process may be implemented recursively.

After applying the 2-dimensional run coding to the error values of each component 56, both the zero-block map 58 (step 420) and the error list 59 (step 430), may be further encoded using context modeling according to well-known techniques. In particular, the context modeling applied in step 430 may involve bit category and magnitude pairs according to well-known techniques. In the event that step 410 is omitted, step 430 simply applies to the error values of each component 56.

Finally, in step 440, all the data output by steps 420 and 430 is encoded using either Arithmetic coding or variable length coding (e.g., Huffman coding or Golumb coding).

Thus, techniques have been described for adaptively selecting between spatial prediction and inter-component prediction techniques depending on which allows better results for any given component of a digital image pixel.

While various embodiments of the present disclosure have been particularly shown and described, it will be understood by those skilled in the art that various changes in form and details may be made therein without departing from the spirit and scope of the present disclosure as defined by the appended claims.

For example, while various pixel value operations have been described as being simple sums, in some embodiments, a clipping operation may be performed according to well-known principles to ensure that the channel bandwidth (e.g., 8 bits) of any given color channel is not exceeded.

In addition, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a computing device, the method comprising:
    receiving an image file, the image file having a set of pixels arranged in a grid, each pixel of the set of pixels having a plurality of color components;
    for each pixel of a subset of the set of pixels:
        for a first color component of the plurality of color components:
            predicting a value of the first color component of that pixel using a first prediction technique to yield a first predicted color value, the first prediction technique including median edge detection; and
            computing a difference between the first predicted color value and the value of the first color component to yield a first error value for that pixel;
        for a second color component of the plurality of color components, the second color component being distinct from the first color component:
            predicting a value of the second color component of that pixel using the first prediction technique to yield a second predicted color value;
            predicting the value of the second color component of that pixel using a second prediction technique to yield a third predicted color value, the second prediction technique lacking median edge detection, the second prediction technique utilizing inter-component prediction with respect to the first color component;
        selecting whichever of the second predicted color value and the third predicted color value is closer to the value of the second color component to yield a selected predicted color value; and computing a difference between the selected predicted color value and the value of the second color component to yield a second error value for that pixel; and encoding the first error value for that pixel and the second error value for that pixel in a compressed color image output stream;

writing the compressed color image output stream to persistent storage as an output compressed image file; and for each pixel of the subset of the set of pixels:

for a third color component of the plurality of color components, the third color component being distinct from the first color component and the second color component:

predicting a value of the third color component of that pixel using the first prediction technique to yield a fourth predicted color value:

predicting the value of the third color component of that pixel using the second prediction technique to yield a fifth predicted color value, the second prediction technique utilizing inter-component prediction with respect to the first color component;

predicting the value of the third color component of that pixel using the second prediction technique to yield a sixth predicted color value, the second prediction technique utilizing inter-component prediction with respect to the second color component;

estimating an error for the fifth predicted color value based on a sum of first color component error values for a set of pixels adjacent to that pixel, the sum being weighted according to a Euclidian distance of each adjacent pixel from that pixel;

estimating an error for the sixth predicted color value based on a sum of second color component error values for the set of pixels adjacent to that pixel, the sum being weighted according to the Euclidian distance of each adjacent pixel from that pixel;

computing a weighted average of the fifth predicted color value and the sixth predicted color value, the fifth predicted color value being weighted by the estimated error for the sixth predicted color value and the sixth predicted color value being weighted by the estimated error for the fifth predicted color value, to yield an average color value;

selecting whichever of the fourth predicted color value and the average color value is closer to the value of the third color component to yield another selected predicted color value; and computing a difference between the other selected predicted color value and the value of the third color component to yield a third error value for that pixel; and encoding the third error value for that pixel in the compressed color image output stream.

2. The method of claim 1 wherein predicting the value of the third color component of that pixel using the second prediction technique to yield the fifth predicted color value includes:

computing a first difference between a third color component of a pixel immediately to the left of that pixel and a third color component of a pixel immediately diagonally above and to the left of that pixel;

computing a second difference between a first color component of the pixel immediately to the left of that pixel and a first color component of the pixel immediately diagonally above and to the left of that pixel;

computing a third difference between the first difference and the second difference;

computing a fourth difference between a third color component of a pixel immediately above that pixel and the third color component of the pixel immediately diagonally above and to the left of that pixel;

computing a fifth difference between a first color component of the pixel immediately above that pixel and the first color component of the pixel immediately diagonally above and to the left of that pixel;

computing a sixth difference between the fourth difference and the fifth difference;

computing a seventh difference between the first color component of that pixel and the first color component of the pixel immediately diagonally above and to the left of that pixel;

if the third difference and the sixth difference are both greater than zero or both less than zero, then setting the fifth predicted color value to be a sum of:

the third color component of the pixel immediately diagonally above and to the left of that pixel;

the seventh difference; and an absolute value of whichever of the third difference and the sixth difference has a larger absolute value; and otherwise, setting the third predicted color value to be a sum of:

the third color component of the pixel immediately diagonally above and to the left of that pixel;

the seventh difference;

the third difference; and the sixth difference.

3. The method of claim 2 wherein predicting the value of the third color component of that pixel using the second prediction technique to yield the sixth predicted color value includes:

computing an eighth difference between a second color component of the pixel immediately to the left of that pixel and a second color component of the pixel immediately diagonally above and to the left of that pixel;

computing a ninth difference between the first difference and the eighth difference;

computing a tenth difference between a second color component of the pixel immediately above that pixel and the second color component of the pixel immediately diagonally above and to the left of that pixel;

computing an eleventh difference between the fourth difference and the tenth difference;

computing a twelfth difference between the second color component of that pixel and the second color component of the pixel immediately diagonally above and to the left of that pixel;

if the ninth difference and the eleventh difference are both greater than zero or both less than zero, then setting the sixth predicted color value to be a sum of:

the third color component of the pixel immediately diagonally above and to the left of that pixel;

the twelfth difference; and an absolute value of whichever of the ninth difference and the eleventh difference has a larger absolute value; and otherwise, setting the sixth predicted color value to be a sum of:

the third color component of the pixel immediately diagonally above and to the left of that pixel;

the twelfth difference;
the ninth difference; and
the eleventh difference.

4. The method of claim 1 wherein:
the first color component is a green component;
the second color component is a red component; and
the third color component is a blue component.

5. The method of claim 1 wherein encoding includes employing arithmetic coding.

6. The method of claim 1 wherein encoding includes employing variable length coding.

7. The method of claim 1 wherein encoding includes employing 2-dimensional run coding.

8. The method of claim 1 wherein encoding includes employing context modeling.

9. A method performed by a computing device, the method comprising:
receiving an image file, the image file having a set of pixels arranged in a grid, each pixel of the set of pixels having a plurality of color components;
for each pixel of a subset of the set of pixels:
for a first color component of the plurality of color components:
predicting a value of the first color component of that pixel using a first prediction technique to yield a first predicted color value, the first prediction technique including median edge detection; and
computing a difference between the first predicted color value and the value of the first color component to yield a first error value for that pixel;
for a second color component of the plurality of color components, the second color component being distinct from the first color component:
predicting a value of the second color component of that pixel using the first prediction technique to yield a second predicted color value;
predicting the value of the second color component of that pixel using a second prediction technique to yield a third predicted color value, the second prediction technique lacking median edge detection, the second prediction technique utilizing inter-component prediction with respect to the first color component;
selecting whichever of the second predicted color value and the third predicted color value is closer to the value of the second color component to yield a selected predicted color value; and
computing a difference between the selected predicted color value and the value of the second color component to yield a second error value for that pixel; and
encoding the first error value for that pixel and the second error value for that pixel in a compressed color image output stream; and
writing the compressed color image output stream to persistent storage as an output compressed image file;
wherein predicting the value of the second color component of that pixel using the second prediction technique to yield the third predicted color value includes:
computing a first difference between a second color component of a pixel immediately to the left of that pixel and a second color component of a pixel immediately diagonally above and to the left of that pixel;
computing a second difference between a first color component of the pixel immediately to the left of that pixel and a first color component of the pixel immediately diagonally above and to the left of that pixel;
computing a third difference between the first difference and the second difference;
computing a fourth difference between a second color component of a pixel immediately above that pixel and the second color component of the pixel immediately diagonally above and to the left of that pixel;
computing a fifth difference between a first color component of the pixel immediately above that pixel and the first color component of the pixel immediately diagonally above and to the left of that pixel;
computing a sixth difference between the fourth difference and the fifth difference;
computing a seventh difference between the first color component of that pixel and the first color component of the pixel immediately diagonally above and to the left of that pixel;
if the third difference and the sixth difference are both greater than zero or both less than zero, then setting the third predicted color value to be a sum of:
the second color component of the pixel immediately diagonally above and to the left of that pixel;
the seventh difference; and
an absolute value of whichever of the third difference and the sixth difference has a larger absolute value; and
otherwise, setting the third predicted color value to be a sum of:
the second color component of the pixel immediately diagonally above and to the left of that pixel;
the seventh difference;
the third difference; and
the sixth difference.

10. A method performed by a computing device, the method comprising:
receiving an image file, the image file having a set of pixels arranged in a grid, each pixel of the set of pixels having a plurality of color components;
for each pixel of a subset of the set of pixels:
for a first color component of the plurality of color components:
predicting a value of the first color component of that pixel using a first prediction technique to yield a first predicted color value, the first prediction technique including median edge detection; and
computing a difference between the first predicted color value and the value of the first color component to yield a first error value for that pixel;
for a second color component of the plurality of color components, the second color component being distinct from the first color component:
predicting a value of the second color component of that pixel using the first prediction technique to yield a second predicted color value;
predicting the value of the second color component of that pixel using a second prediction technique to yield a third predicted color value, the second prediction technique lacking median edge detection, the second prediction technique utilizing inter-component prediction with respect to the first color component;
selecting whichever of the second predicted color value and the third predicted color value is closer to the value of the second color component to yield a selected predicted color value; and computing a difference between the selected predicted color value and the value of the second color component to yield a second error value for that pixel; and encoding the first error value for that pixel and the second error value for that pixel in a compressed color image output stream; and writing the compressed color image output stream to persistent storage as an output compressed image file;

wherein predicting the value of the first color component of that pixel using the first prediction technique to yield the first predicted color value includes:

(a) setting a spatial preliminary predicted value by:
   if a maximum of a first color component of a pixel immediately to the left of that pixel and a first color component of a pixel immediately above that pixel does not exceed a first color component of a pixel immediately diagonally above and to the left of that pixel, then setting the spatial preliminary predicted value to a minimum of the first color component of the pixel immediately to the left of that pixel and the first color component of the pixel immediately above that pixel;
   otherwise, if the first color component of the pixel immediately diagonally above and to the left of that pixel does not exceed the minimum of the first color component of the pixel immediately to the left of that pixel and the first color component of the pixel immediately above that pixel, then setting the spatial preliminary predicted value to a maximum of the first color component of the pixel immediately to the left of that pixel and the first color component of the pixel immediately above that pixel; and
   otherwise, setting the spatial preliminary predicted value to the first color component of the pixel immediately to the left of that pixel plus the first color component of the pixel immediately above that pixel minus the first color component of the pixel immediately diagonally above and to the left of that pixel;

(b) setting a left preliminary predicted value by:
   computing a first difference between a first color component of a pixel immediately to the left of that pixel and a first color component of a pixel immediately diagonally above and to the left of that pixel;
   computing a second difference between a first color component of a pixel two pixels to the left of that pixel and a first color component of a pixel immediately to the left of the pixel immediately diagonally above and to the left of that pixel;
   computing a third difference between the first difference and the second difference;
   computing a fourth difference between a first color component of a pixel immediately above that pixel and the first color component of the pixel immediately diagonally above and to the left of that pixel;
   computing a fifth difference between the first color component of the pixel immediately diagonally above and to the left of that pixel and the first color component of the pixel immediately to the left of the pixel immediately diagonally above and to the left of that pixel;
   computing a sixth difference between the fourth difference and the fifth difference;
   computing a seventh difference between the first color component of the pixel immediately to the left of that pixel and the first color component of the pixel immediately to the left of the pixel immediately diagonally above and to the left of that pixel;

if the third difference and the sixth difference are both greater than zero or both less than zero, then setting the left preliminary predicted color value to be a sum of:
      the first color component of the pixel immediately diagonally above and to the left of that pixel;
      the seventh difference; and
      an absolute value of whichever of the third difference and the sixth difference has a larger absolute value; and
   otherwise, setting the left preliminary predicted color value to be a sum of:
      the first color component of the pixel immediately diagonally above and to the left of that pixel;
      the seventh difference;
      the third difference; and
      the sixth difference;

(c) setting a top preliminary predicted value by:
   computing an eighth difference between the first color component of the pixel immediately diagonally above and to the left of that pixel and a first color component of a pixel immediately above the pixel immediately diagonally above and to the left of that pixel;
   computing a ninth difference between the first difference and the eighth difference;
   computing a tenth difference between a first color component of a first color component of a pixel two pixels above that pixel and the first color component of the pixel immediately above the pixel immediately diagonally above and to the left of that pixel;
   computing an eleventh difference between the fourth difference and the tenth difference;
   computing a twelfth difference between the first color component of the pixel immediately above that pixel and the first color component of the pixel immediately above the pixel immediately diagonally above and to the left of that pixel;
   if the ninth difference and the eleventh difference are both greater than zero or both less than zero, then setting the top preliminary predicted color value to be a sum of:
      the first color component of the pixel immediately diagonally above and to the left of that pixel;
      the twelfth difference; and
      an absolute value of whichever of the ninth difference and the eleventh difference has a larger absolute value; and
   otherwise, setting the top preliminary predicted color value to be a sum of:
      the first color component of the pixel immediately diagonally above and to the left of that pixel;
      the twelfth difference;
      the ninth difference; and
      the eleventh difference;

(d) setting a final preliminary predicted value by:
   if the spatial preliminary predicted value is between the left preliminary predicted value and the top preliminary predicted value, then setting the final preliminary predicted value to be the spatial preliminary predicted value; and
   otherwise, setting the final preliminary predicted value to whichever of the left preliminary predicted value and the top preliminary predicted value is closer in value to the spatial preliminary predicted value; and (e) setting the first predicted color value by:
   estimating an error for the spatial preliminary predicted value based on a sum of spatial preliminary predicted value error values for a set of pixels adjacent to that pixel, the sum being weighted according to a Euclidian distance of each adjacent pixel from that pixel;

estimating an error for the final preliminary predicted value based on a sum of final preliminary predicted value error values for the set of pixels adjacent to that pixel, the sum being weighted according to the Euclidian distance of each adjacent pixel from that pixel; and computing a weighted average of the spatial preliminary predicted value and the final preliminary predicted value, the spatial preliminary predicted value being weighted by the estimated error for the final preliminary predicted value and the final preliminary predicted value being weighted by the estimated error for the spatial preliminary predicted value, to yield the first predicted color value.

11. A method performed by a computing device, the method comprising:

receiving an image file, the image file having a set of pixels arranged in a grid, each pixel of the set of pixels having a plurality of color components;

for each pixel of a subset of the set of pixels:
  for a first color component of the plurality of color components:
    predicting a value of the first color component of that pixel using a first prediction technique to yield a first predicted color value, the first prediction technique including median edge detection; and
    computing a difference between the first predicted color value and the value of the first color component to yield a first error value for that pixel;
  for a second color component of the plurality of color components, the second color component being distinct from the first color component:
    predicting a value of the second color component of that pixel using the first prediction technique to yield a second predicted color value;
    predicting the value of the second color component of that pixel using a second prediction technique to yield a third predicted color value, the second prediction technique lacking median edge detection, the second prediction technique utilizing inter-component prediction with respect to the first color component;
    selecting whichever of the second predicted color value and the third predicted color value is closer to the value of the second color component to yield a selected predicted color value; and
    computing a difference between the selected predicted color value and the value of the second color component to yield a second error value for that pixel; and
  encoding the first error value for that pixel and the second error value for that pixel in a compressed color image output stream; and writing the compressed color image output stream to persistent storage as an output compressed image file;

wherein:
encoding includes employing 2-dimensional run coding; and
employing 2-dimentional run coding includes encoding adaptively-sized square blocks of pixels which all have zero first error values as single entries.

12. A data storage apparatus comprising:
a host interface;
memory;
persistent storage; and
a processor, the processor being configured to perform the operations of:

receiving an image file into memory from the host interface, the image file having a set of pixels arranged in a grid, each pixel of the set of pixels having a plurality of color components;

for each pixel of a subset of the set of pixels:
  for a first color component of the plurality of color components:
    predicting a value of the first color component of that pixel using a first prediction technique to yield a first predicted color value, the first prediction technique including median edge detection; and
    computing a difference between the first predicted color value and the value of the first color component to yield a first error value for that pixel;
  for a second color component of the plurality of color components, the second color component being distinct from the first color component:
    predicting a value of the second color component of that pixel using the first prediction technique to yield a second predicted color value;
    predicting the value of the second color component of that pixel using a second prediction technique to yield a third predicted color value, the second prediction technique lacking median edge detection, the second prediction technique utilizing inter-component prediction with respect to the first color component;
    selecting whichever of the second predicted color value and the third predicted color value is closer to the value of the second color component to yield a selected predicted color value; and
    computing a difference between the selected predicted color value and the value of the second color component to yield a second error value for that pixel; and
  encoding the first error value for that pixel and the second error value for that pixel in a compressed color image output stream;

writing the compressed color image output stream to the persistent storage as an output compressed image file; and for each pixel of the subset of the set of pixels:
  for a third color component of the plurality of color components, the third color component being distinct from the first color component and the second color component:
    predicting a value of the third color component of that pixel using the first prediction technique to yield a fourth predicted color value;
    predicting the value of the third color component of that pixel using the second prediction technique to yield a fifth predicted color value, the second prediction technique utilizing inter-component prediction with respect to the first color component;
    predicting the value of the third color component of that pixel using the second prediction technique to yield a sixth predicted color value, the second prediction technique utilizing inter-component prediction with respect to the second color component;
    estimating an error for the fifth predicted color value based on a sum of first color component error values for a set of pixels adjacent to that pixel, the sum being weighted according to a Euclidian distance of each adjacent pixel from that pixel;

estimating an error for the sixth predicted color value based on a sum of second color component error values for the set of pixels adjacent to that pixel, the sum being weighted according to the Euclidian distance of each adjacent pixel from that pixel;

computing a weighted average of the fifth predicted color value and the sixth predicted color value, the fifth predicted color value being weighted by the estimated error for the sixth predicted color value and the sixth predicted color value being weighted by the estimated error for the fifth predicted color value, to yield an average color value;

selecting whichever of the fourth predicted color value and the average color value is closer to the value of the third color component to yield another selected predicted color value; and computing a difference between the other selected predicted color value and the value of the third color component to yield a third error value for that pixel; and encoding the third error value for that pixel in the compressed color image output stream.

13. The apparatus of claim 12 wherein predicting the value of the third color component of that pixel using the second prediction technique to yield the fifth predicted color value includes:

computing a first difference between a third color component of a pixel immediately to the left of that pixel and a third color component of a pixel immediately diagonally above and to the left of that pixel;

computing a second difference between a first color component of the pixel immediately to the left of that pixel and a first color component of the pixel immediately diagonally above and to the left of that pixel;

computing a third difference between the first difference and the second difference;

computing a fourth difference between a third color component of a pixel immediately above that pixel and the third color component of the pixel immediately diagonally above and to the left of that pixel;

computing a fifth difference between a first color component of the pixel immediately above that pixel and the first color component of the pixel immediately diagonally above and to the left of that pixel;

computing a sixth difference between the fourth difference and the fifth difference;

computing a seventh difference between the first color component of that pixel and the first color component of the pixel immediately diagonally above and to the left of that pixel;

if the third difference and the sixth difference are both greater than zero or both less than zero, then setting the fifth predicted color value to be a sum of:
the third color component of the pixel immediately diagonally above and to the left of that pixel;
the seventh difference; and
an absolute value of whichever of the third difference and the sixth difference has a larger absolute value; and otherwise, setting the third predicted color value to be a sum of:
the third color component of the pixel immediately diagonally above and to the left of that pixel;
the seventh difference;
the third difference; and
the sixth difference.

14. The apparatus of claim 13 wherein predicting the value of the third color component of that pixel using the second prediction technique to yield the sixth predicted color value includes:

computing an eighth difference between a second color component of the pixel immediately to the left of that pixel and a second color component of the pixel immediately diagonally above and to the left of that pixel;

computing a ninth difference between the first difference and the eighth difference;

computing a tenth difference between a second color component of the pixel immediately above that pixel and the second color component of the pixel immediately diagonally above and to the left of that pixel;

computing an eleventh difference between the fourth difference and the tenth difference;

computing a twelfth difference between the second color component of that pixel and the second color component of the pixel immediately diagonally above and to the left of that pixel;

if the ninth difference and the eleventh difference are both greater than zero or both less than zero, then setting the sixth predicted color value to be a sum of:
the third color component of the pixel immediately diagonally above and to the left of that pixel;
the twelfth difference; and
an absolute value of whichever of the ninth difference and the eleventh difference has a larger absolute value; and otherwise, setting the sixth predicted color value to be a sum of:
the third color component of the pixel immediately diagonally above and to the left of that pixel;
the twelfth difference;
the ninth difference; and
the eleventh difference.

15. The apparatus of claim 12 wherein:
the first color component is a green component;
the second color component is a red component; and
the third color component is a blue component.

16. The apparatus of claim 12 wherein encoding includes employing arithmetic coding.

17. The apparatus of claim 12 wherein encoding includes employing variable length coding.

18. The apparatus of claim 12 wherein encoding includes employing 2dimensional run coding.

19. The apparatus of claim 12 wherein encoding includes employing context modeling.

20. A computer program product comprising a non-transitory computer-readable storage medium storing a set of instruction, which, when executed by a computer, cause the computer to perform the following operations:

receiving an image file, the image file having a set of pixels arranged in a grid, each pixel of the set of pixels having a plurality of color components;

for each pixel of a subset of the set of pixels:
for a first color component of the plurality of color components:
predicting a value of the first color component of that pixel using a first prediction technique to yield a first predicted color value, the first prediction technique including median edge detection; and computing a difference between the first predicted color value and the value of the first color component to yield a first error value for that pixel;

for a second color component of the plurality of color components, the second color component being distinct from the first color component:

predicting a value of the second color component of that pixel using the first prediction technique to yield a second predicted color value;

predicting the value of the second color component of that pixel using a second prediction technique to yield a third predicted color value, the second prediction technique lacking median edge detection, the second prediction technique utilizing inter-component prediction with respect to the first color component;

selecting whichever of the second predicted color value and the third predicted color value is closer to the value of the second color component to yield a selected predicted color value; and computing a difference between the selected predicted color value and the value of the second color component to yield a second error value for that pixel; and encoding the first error value for that pixel and the second error value for that pixel in a compressed color image output stream; and writing the compressed color image output stream to persistent storage as an output compressed image file;

wherein:

encoding includes employing 2-dimensional run coding; and employing 2-dimentional run coding includes encoding adaptively-sized square blocks of pixels which all have zero first error values as single entries.

* * * * *